United States Patent
Shamsaasef et al.

(10) Patent No.: US 10,015,542 B2
(45) Date of Patent: Jul. 3, 2018

(54) METHOD AND APPARATUS FOR SECURE STORAGE AND RETRIEVAL OF LIVE OFF DISK MEDIA PROGRAMS

(71) Applicant: General Instrument Corporation, Horsham, PA (US)

(72) Inventors: Rafie Shamsaasef, San Diego, CA (US); William P Franks, San Diego, CA (US); Geetha Mangalore, San Diego, CA (US); Paul Moroney, La Jolla, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 14/213,202

(22) Filed: Mar. 14, 2014

(65) Prior Publication Data

US 2014/0270161 A1    Sep. 18, 2014

Related U.S. Application Data (60) Provisional application No. 61/801,260, filed on Mar. 15, 2013.

(51) Int. Cl.
| | | |
|---|---|---|
| *H04L 9/00* | (2006.01) | |
| *H04N 21/4405* | (2011.01) | |
| *H04N 21/4627* | (2011.01) | |
| *H04N 21/4147* | (2011.01) | |
| *H04N 21/4408* | (2011.01) | |
| *H04N 21/845* | (2011.01) | |

(52) U.S. Cl.
CPC ..... *H04N 21/4405* (2013.01); *H04N 21/4147* (2013.01); *H04N 21/4408* (2013.01); *H04N 21/4627* (2013.01); *H04N 21/8456* (2013.01)

(58) Field of Classification Search
CPC .................................................. H04N 21/4408
See application file for complete search history.

(56) References Cited

U.S. PATENT DOCUMENTS

| | | | |
|---|---|---|---|
| 7,191,332 B1 * | 3/2007 | Pankajakshan ..... | H04L 63/0428 713/160 |
| 8,751,800 B1 * | 6/2014 | Dorwin ............... | G06F 21/6209 380/277 |
| 8,831,228 B1 * | 9/2014 | Agrawal ............... | H04L 9/0822 380/277 |

(Continued)

OTHER PUBLICATIONS

PCT Search Report & Written Opinion, Re: Application #PCT/US2014/028983; dated Aug. 20, 2014.

(Continued)

*Primary Examiner* — John B King
*Assistant Examiner* — Darshan Dhruv
(74) *Attorney, Agent, or Firm* — Thomas A. Ward (57) ABSTRACT

A method and system are provided for securely storing and retrieving live off-disk media programs. Events delineate media segments, each of which are encrypted with a different key so as to be streamable to a remote device via digital living network alliance (DLNA) or HTTP live streaming protocols. Media segments and identifiers for managing the storage and retrieval of such media segments are compatible with live streaming data structures, obviating the need to re-encrypt data streams.

10 Claims, 10 Drawing Sheets

(56) References Cited

U.S. PATENT DOCUMENTS

| | | | |
|---|---|---|---|
| 2002/0025045 A1* | 2/2002 | Raike | H04L 63/0442 380/280 |
| 2005/0265555 A1* | 12/2005 | Pippuri | G06F 21/10 380/284 |
| 2006/0047601 A1* | 3/2006 | Peterka | H04H 60/14 705/51 |
| 2006/0107285 A1* | 5/2006 | Medvinsky | H04N 7/1675 725/25 |
| 2006/0235800 A1* | 10/2006 | Furlong | G06F 21/105 705/59 |
| 2008/0267398 A1* | 10/2008 | Peterka | G11B 20/00086 380/200 |
| 2008/0267411 A1* | 10/2008 | Peterka | H04L 9/0841 380/279 |
| 2008/0270308 A1* | 10/2008 | Peterka | G06F 21/10 705/51 |
| 2008/0270311 A1 | 10/2008 | Peterka et al. | |
| 2011/0231660 A1* | 9/2011 | Kanungo | H04N 7/165 713/168 |
| 2011/0235801 A1* | 9/2011 | Peterka | H04N 21/2343 380/200 |
| 2012/0173877 A1* | 7/2012 | Pendakur et al. | 713/169 |
| 2012/0189121 A1* | 7/2012 | Duval | H04L 9/0869 380/255 |
| 2012/0221865 A1* | 8/2012 | Hahn et al. | 713/193 |
| 2012/0275597 A1* | 11/2012 | Knox | H04L 9/0833 380/210 |
| 2012/0284804 A1* | 11/2012 | Lindquist | H04L 63/0428 726/29 |
| 2013/0283393 A1* | 10/2013 | Hierro | G06F 21/10 726/27 |
| 2014/0196079 A1* | 7/2014 | Jannard | H04L 9/0825 725/31 |
| 2014/0215214 A1* | 7/2014 | Barnes | G06F 21/10 713/171 |
| 2014/0280750 A1* | 9/2014 | Panje | H04L 67/2804 709/219 |

OTHER PUBLICATIONS

"Passport Echo Customer Service Guide 237 Using the Digital Video Recorder (DVR): Understanding Your Digital Video Recorder (DVR)", Jan. 17, 2007, retrieved from the Internet at URL<http://help.rcn.com/pf/12/webfiles/files/ONNET6907/converters/Echo_DVR_info.pdf> on Aug. 11, 2014, pp. 237-244.

* cited by examiner

METHOD AND APPARATUS FOR SECURE STORAGE AND RETRIEVAL OF LIVE OFF DISK MEDIA PROGRAMS

CROSS-REFERENCE TO RELATED APPLICATIONS

This application claims benefit of U.S. Provisional Patent Application No. 61/801,260, entitled "SECURE HANDLING OF LIVE OFF DISK (LOD) CONTENT USING DRM SYSTEM," by Rafie Shamsaasef, William Franks, Geetha Mangalore, and Paul Moroney, filed Mar. 15, 2003, which application is hereby incorporated by reference herein.

BACKGROUND OF THE INVENTION

1. Field of the Invention

The present invention relates to systems and methods for recording and playing back media programs embodied in media streams, and in particular to a system and method for secure storage and retrieval of media programs temporarily stored in live buffer.

2. Description of the Related Art

Compression technologies have made the storage and transmission of media programs having audiovisual information to consumers feasible. Such video compression techniques (hereinafter generically referred to as compressed packetized transport (CPT) techniques typically break the media program into a plurality of frames that are compressed using spatial and/or temporal encoding techniques. Typically, some of the frames are identified as index (or I) frames, which are only spatially encoded. Such frames can be decoded without requiring data from any of the other frames, and serve as a datum for other frames. Other frames (known as predictive or P frames) also use temporal compression techniques, wherein the data recorded for the frame represent changes from an earlier frame. Since frame-to-frame differences are often small, such frames are substantially more efficiently compressed than the I frames. P frames, however, cannot be decoded without reference to another (e.g. I) frame. Still other frames (known as bi-predictive or B frames) also use spatial and temporal compression, but obtain their values from multiple frames. B frames offer higher compression than I frames or P frames, but must reference those frames to be reproduced. MPEG-2, MPEG-3, MPEG-4, H.264, H.265, and AVC are examples of CPT paradigms.

Compressed media programs can be transmitted via satellite, cable, terrestrial wireless transmission, or the Internet, or received in analog form and compressed locally. Once received by a suitable device such as a set top box (STB) or receiver, the media programs may be decoded and/or decrypted (if encoded and/or encrypted by the headend or source of the media program) and provided to a display device for presentation to the user.

Such media programs may also be locally recorded for later playback using devices such as a digital video recorder (DVR), which may be integrated with the receiver or a separate device. Such recordings are typically stored on a large capacity storage device such as an internal or external hard disk drive (HDD).

DVRs typically include a RAM buffer that stores media program streams as they are received and plays them back a user controllable short time later. Such buffers are known as "live off disk" or LOD buffers. These buffers provide a "live pause" capability that allows the user to pause the playback of the received media program, while the LOD buffer continues to store the media streams as they are received. When the user thereafter selects "play," playback from the LOD buffer resumes from the temporal point where the pause command was received. The LOD buffer also offers playback of the media program(s) stored therein from any randomly selected temporal point, and thus enables trick play and other features. The LOD buffer is typically implemented in a partition of the same hard disk drive (HDD) used to permanently store media programs, although separate memory devices may also be used.

In most cases, storage of incoming media programs into the LOD buffer is not initiated upon the selection of the "pause" command. Rather, media streams received by the DVR are routinely sent to the LOD buffer where they are stored, retained, and written over on a first-in-first out (FIFO) basis without user intervention or command. LOD buffers typically include enough memory to store two or more hours of program material, hence it is possible for several programs to be stored in the DVR LOD buffer at a time. However, since the LOD buffer operates on a FIFO basis, any programs stored in the LOD buffer are subject to being erased or written over to make room for newer media programs unless they are designated for permanent storage. Hence, there is a need to provide a means for selecting recordings within the LOD buffer for permanent (e.g. indeterminate) storage.

It is desirable for DVRs to have the capacity to transmit data to client devices such as cellphones, laptops, or tablet computers. DVRs that are capable of such functionality are commonly known as gateway DVRs. The transmission of such information is often accomplished by use of a HTTP live streaming (HLS). HLS is an HTTP (hypertext transfer protocol) based media streaming protocol that is used in selected client devices. HLS works by breaking up an incoming media stream into a sequence of small HTTP-based file downloads known as chunks, with each chunk being a small portion of a potentially unbounded transport stream. At the start of the streaming session, the client device receives a playlist or manifest (*.m3u8), and uses that playlist or manifest to determine which chunks to request in which order. The playlist may also contain other metadata, and may be continually updated as additional media chunks become available. Typically, such streams are secure with before transmission, for example, using a Digital Transmission Licensing Administrator (DTLA) approved technology such as Internet Protocol Rights Management (IPRM).

To assure that stored media program recordings are not subjected to unauthorized use, they are encrypted before storage, even media program recordings that are only to be temporarily stored in the LOD buffer. Such recordings are typically encrypted using techniques different than those used for secure streaming. Hence, the gateway DVR is required to retrieve the encrypted media program from storage, decrypt it, then re-encrypt the media program for transmission via HLS. This presents processing challenges that can result in more expensive gateway DVRs or gateway DVRs that are less responsive to client requests.

In view of the foregoing, there is a need for systems and methods for securely storing the contents of LOD buffers in a form that permits their conversion to permanent storage and later transmission to clients without requiring decryption and re-encryption of the media stream. This disclosure describes systems and methods that satisfy that need.

SUMMARY OF THE INVENTION

To address the requirements described above, the present invention discloses a method and apparatus for providing at least a portion of a buffered media program for long term storage. In one embodiment, the method comprises receiving a media stream comprising at least a portion of the media program and content rights data defining one or more rights to use the at least a portion of the media program, generating media stream indexes from the received media stream, each media stream index associated with one of a plurality of media stream blocks, generating event indexes delimiting media stream indexes that correspond to events occurring temporally during reception of the media stream, the events defining one of a plurality of media stream segments therebetween, generating a content key for each media segment according to the content rights data and a key seed, encrypting each media segment according to the content key associated with each media segment, generating media program rights data comprising the key seed and the event index for each media segment, and buffering each media segment and the media program rights data associated with each media segment. In another embodiment, an apparatus comprises a processor communicatively coupled to a memory storing instructions for performing the foregoing operations.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
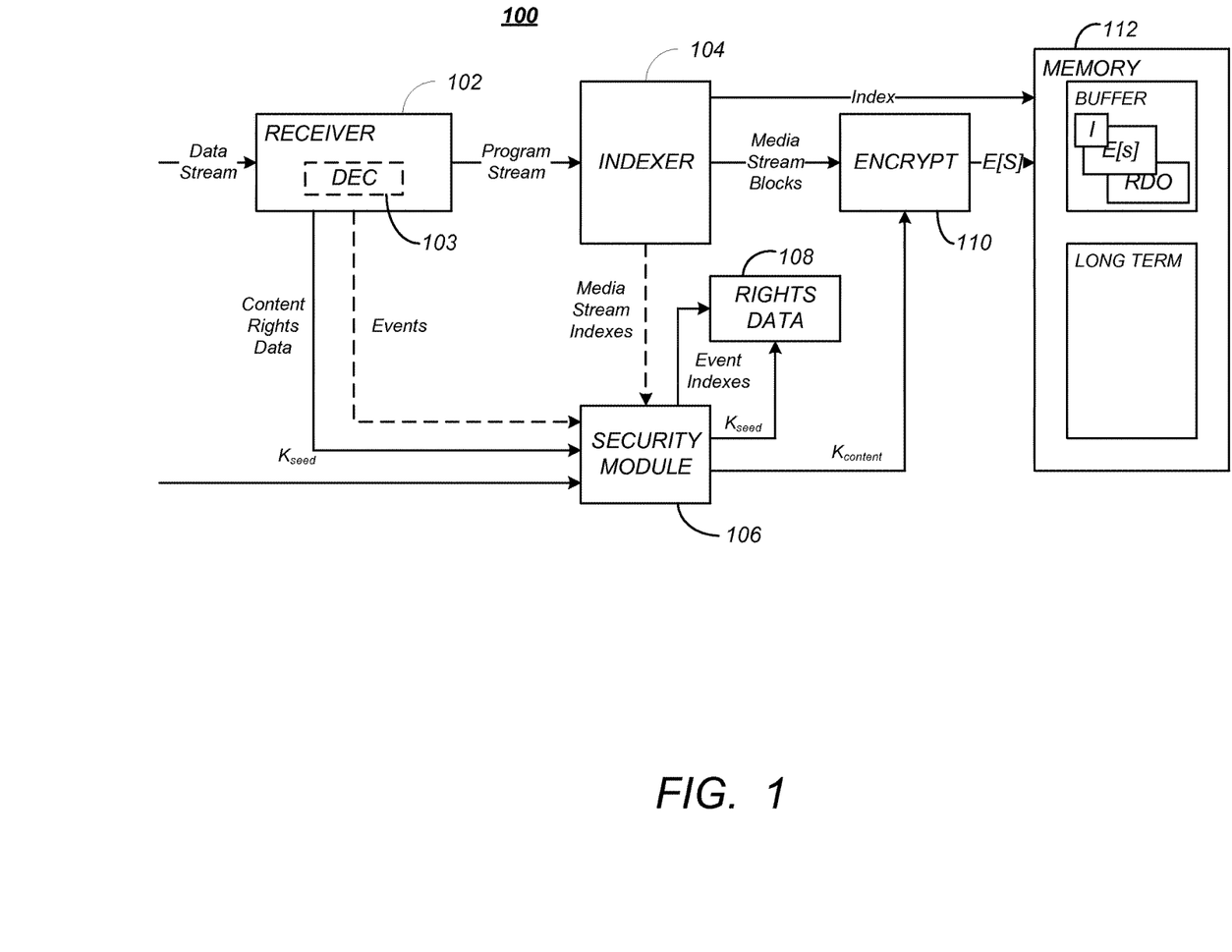
FIG. 1 is a diagram illustrating one embodiment of a gateway DVR.

Storage and Streaming Playback of Media Programs Temporarily Buffered in LOD Buffer FIG. 1 is a diagram of a typical gateway DVR 100. The gateway DVR 100 comprises a receiver 102, an indexer 104, a security module 106, an encryption module, and a memory 112.

The receiver 102 receives data streams from headends such as satellite television providers such as DIRECTV or ECHOSTAR, cable television providers such as TIME WARNER CABLE, broadcast television providers such as ABC or on-line television providers such as HULU or NETFLIX. As such, the receiver 102 may comprise a set top box (STB) designed specifically to receive the data stream, or may comprise a general purpose processing device such as a desktop or laptop computer.

Data streams are typically in packetized format, and the media programs within the data streams are typically compressed as well. Media program packets may also be encrypted so as to restrict access to authorized subscribers. In such cases, the receiver 102 comprises a conditional access system that includes an decryptor 103 for decrypting the program stream.

The gateway DVR 100 also receives data that describes the rights associated with the media program transmitted in the data stream. Such rights may include, for example, the right to play the media program and/or the right to copy the media program. Such data may be provided from the headend to the gateway DVR as a part of the data stream (as shown in FIG. 1), but may also be provided by means independent from the data stream The gateway DVR 100 also comprises an indexer 104. The indexer parses through the incoming program stream and creates media stream blocks, each addressable by media stream indexes. The media stream indexes are provided to a security module 106 that generates a content key $K_{cont}$ that is used to encrypt the media stream blocks using a seed key $K_{seed}$ and content rights data. The security module 106 also monitors for events, and generates event indexes from the media stream indexes and the events. In one embodiment, the security module 106 accomplishes this based on incoming content rights data for any segment of the media content. Those events define media stream segments, which may comprise a plurality of media stream blocks. The event indexes and $K_{seed}$ is used to generate a rights object 108. While the gateway DVR could be a consumer device, it may also comprise an edge media server having a buffer for staging media before transmitting it to clients. The buffers used for this staging process are also considered LOD buffers.

Figure 2:
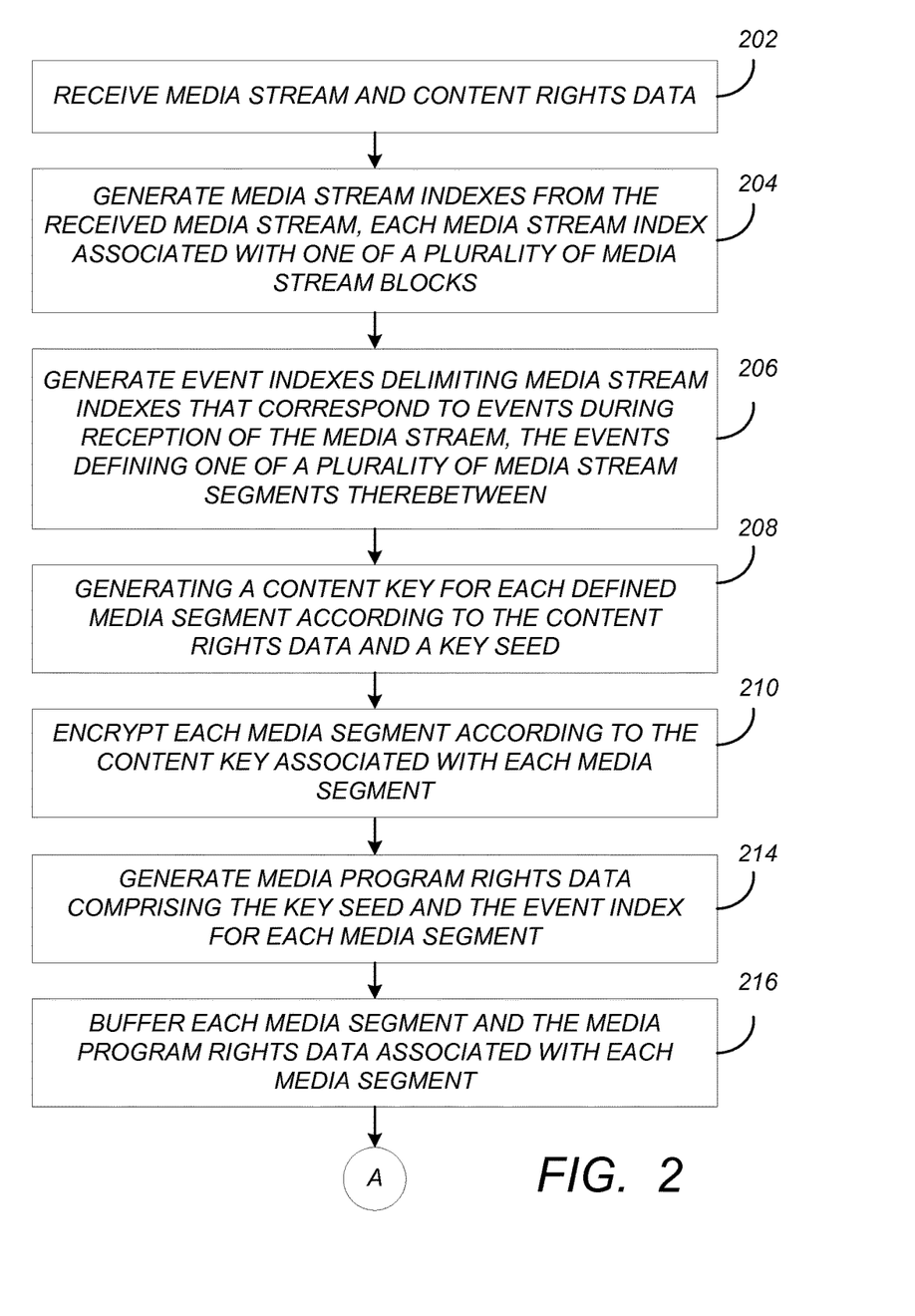
FIG. 2 is a diagram illustrating exemplary operations that can be used to securely store and retrieve live off-disk media programs.

FIG. 2 is a diagram illustrating exemplary operations that can be used to securely store and retrieve live off-disk media programs. A media stream and content rights data is received, as shown in block 202. This may be performed, for example, by receiver 102. In the embodiment shown in FIG. 2, the content rights data and the media stream are be received within the same data stream, but this need not be the case. The content rights data may be provided in a separate data stream using the same transmission means as the media stream, or may be provided using a completely different communications system. For example, the media stream may be provided via wireless satellite transmission, while the content rights data may be provided via the Internet, or via a phone line via the public switched telephone network (PSTN).

Figure 3:
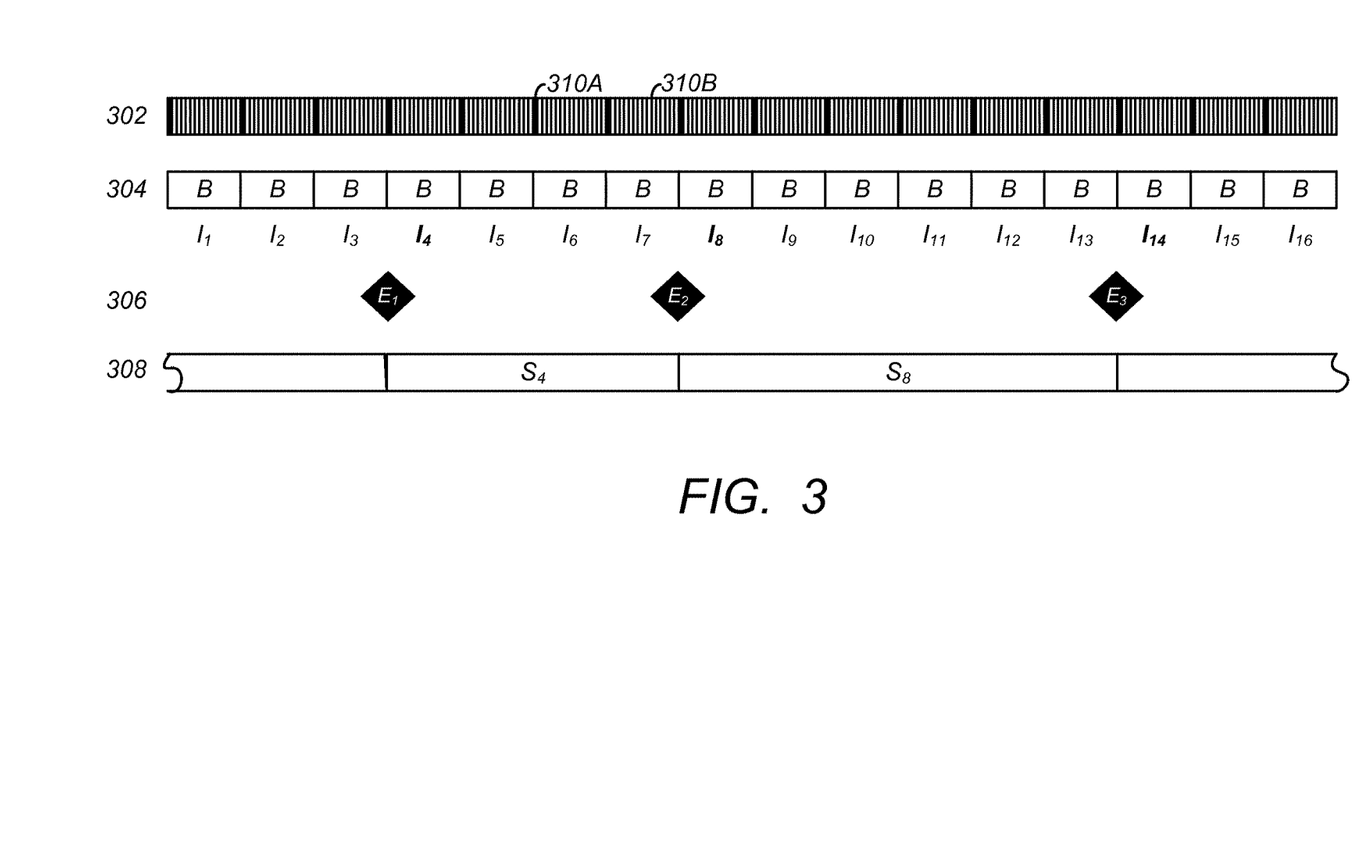
FIG. 3 is a diagram illustrating the generation of indexes and media stream blocks.

In block 204, media stream indexes are generated from the received media stream, wherein each of the media indexes is associated with one of a plurality of media stream blocks. This operation is typically performed by the gateway DVR 100 as so that the incoming media stream can be stored and recalled when needed for playback. In one embodiment, the blocks FIG. 3 is a diagram illustrating the generation of indexes and media stream blocks. Media stream 302 typically comprises a plurality of frames 310. Typically Such frames include index frames (I-frames) that utilize spatial compression, but not temporal compression. Hence, the images in I-frames can be reconstructed by decompression techniques that do not require reference to another one of the frames. The frames also include predictive frames (P-frames) that require reference at least one preceding frame for decompression, and bi-predictive (B-frames) that require reference to both preceding and following frames for decompression. Since I-frames represent milestones within the media stream that can be easily decompressed, each of the data blocks 304 is constructed from the media stream so that it includes, and in fact, begins with an I frame. The temporal length of the media stream blocks 304 of FIG. 3 are depicted as constant over time, but that is generally not the case. Instead, the pictures between I-frames are commonly known as a group of pictures (GOP) and can comprise many more or many less frames than indicated. It is also possible to have more than one I frame within a media stream block, if desired, but if blocks are defined this way, trick play operations are more difficult to implement as the time resolution between I frames is reduced.

Once the indexes ($I_1$-$I_N$) are created, they can be used to reference back to any of the blocks 304 of the media stream. Accordingly, when the gateway DVR 100 receives the media stream, the frames 310 of the media stream are parsed into blocks beginning with I-frames, indexes ($I_1$-$I_N$) are generated from the parsed media stream, and both the blocks and the an index file having the indexes ($I_1$-$I_N$) is stored in a buffer such as a partition of the memory 112. Similarly, when playback of the media stream is required, the index is used to find the media stream blocks corresponding to the desired temporal location in the media program, and those media stream blocks are retrieved from the buffer or memory 112 for presentation.

The media stream arriving at the receiver 102 may be encrypted. Typically, the media stream is decrypted using decryptor 103 before indexing and storage, so that the media stream can be presented for display. However media content providers typically forbid storage of any significantly long portions of the decrypted media stream, hence, the media stream is usually re-encrypted before storage, even if such storage is only in a temporary LOD buffer. This is implemented by the generation of a content key $K_{cont}$ that is supplied to the encryptor 110. While a different content key can be defined for each media block or even each frame of the media stream, this would result in a large number of content keys that would need to be stored and managed. To minimize the number of required content keys while still providing different content keys when necessary, the gateway DVR 100 is configured to allow the generation of a new content encryption key in response an event that implicates the need for a new key. Exemplary events 306 are further described below, and can include a change in the content rights data. Such a change may occur if the media program manifested in the media stream changes, as would be the case if the user changes channels, or if the content provider begins transmitting a different program in the media stream as each may require a different content encryption key. To support this functionality, the security module 106 receives the generated media stream indexes from the indexer 104 as well as the content rights data (changes to which may signals an event) and may also receive information signaling other events which implicate the need for a new content key. Using this information the security module generates event indexes that delimit the media stream indexes that correspond to events during the reception of the media stream, as shown in bock 206 of FIG. 2. Media segments 308 are therefore defined between each event. In the example depicted in FIG. 3, events 306 $E_1$, $E_2$ and $E_3$ occur at the indicated times in the media stream, signaling the security module to designate event indexes $I_4$, $I_8$, and $I_{14}$ as event indexes. Alternatively the event indexes may be generated and denoted without reference to the media block references (e.g. as $EI_1$, $EI_2$ and $EI_3$), and may simply be generated directly from the media stream frames with the boundaries of the segments 308 defined by the frame associated with the temporal location of the events 306. That the segments may be defined by events independent of the media blocks 304 and their indexing is denoted by the dashed line from the indexer 104 to the security module 106.

As described in block 208, a content key is generated for each defined media segment according to the content rights data and the key seed, $K_{seed}$. In one embodiment, the key seed is a key derived from a identifier of the content of the media stream. Such identifier can be a name of the content asset (e.g. the name of a movie) or combination of a name of the program, the channel the media stream embodying the program is transmitted on, or other information.

The content key is then used to encrypt each media segment 308, as shown in block 210. This is accomplished, for example, by encryptor 110. The security module 106 then generates a media rights data that comprises the event index for each defined media segment 308 as well as the key seed, as shown in block 214. The encrypted media segments, indexes, and media program rights data are then stored or buffered as shown in block 216. This can be accomplished by memory 112, or in other gateway DVR 100 memory (for example, the security module 106 may include its own buffer memory for purposes of storing media program rights data).

The operations illustrated FIG. 2 can be on going, and performed while the data stream is received. Hence, the media stream is separated into indexed blocks, and segments identified as events occur with media program rights data generated for each segment, and the resulting segments encrypted using content keys generated from content rights and a key seed, with the encrypted content and the information needed to retrieve and decrypt it buffered for retrieval and use when required. As described above, if this information is stored in a LOD buffer, several hours worth of media streams may be recorded, which may comprise more than one media program (e.g. television show or movie) or portion of a media program. Further, if not designated for permanent storage, the contents of the LOD buffer will eventually be overwritten with other data. Consequently, if the user wishes to store media programs temporarily stored in the LOD buffer on a permanent basis, the user provides a command to do so. Such a command may be provided while the media program desired for permanent storage is being received, or after the media program has been received, but has not been overwritten (at least not entirely so) by other data into the LOD buffer.

Figure 4:
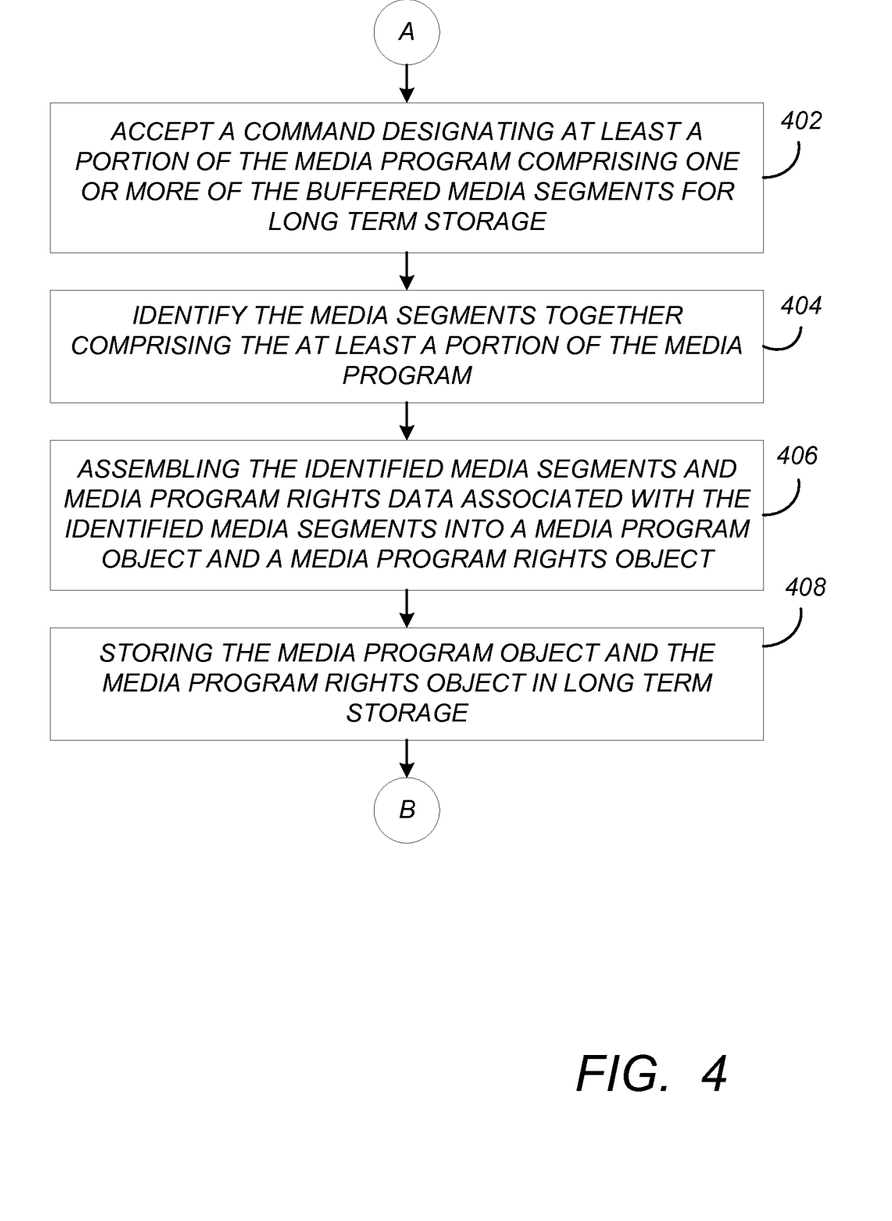
FIG. 4 is a diagram illustrating exemplary operations performed when the user wishes designate at least a portion of a media program stored in the LOD buffer for long term storage.

FIG. 4 is a diagram illustrating exemplary operations performed when the user wishes designate at least a portion of a media program stored in the LOD buffer for long term storage. The term "long term" rather than "permanent" is used herein to acknowledge the fact that no storage is permanent, as the user may decide to later delete the stored object or the gateway DVR may fail. Items may also be stored for "long term," yet still be designated for erasure at some point in the future (e.g. because the gateway DVR has been set to erase programs older than a designated time frame). For purpose of this disclosure, "long term" generally refers to storage greater than that which is possible using the LOD buffer alone and specifically storage for an order of magnitude or more longer than the LOD buffer permits.

A command designating at least a portion of a media program comprising one or more of the buffered media segments for long term storage is received, as shown in block 402. In response to this command, the security module identifies the media segments 308 that together comprise the selected at least a portion of the media program, assembles the identified media segments into a media program object and assembles the media program rights associated with the identified media segments into a media program rights object, as shown in blocks 404-406. In block 408, the media program object and the media program rights object are stored in long term storage.

Identifying media segments that together comprise the selected media program (or portion thereof) can be accomplished in a number of different ways. For example, the index ($I_1$-$I_N$) for each block 304 or segment 308 of the media stream may include or be mapped to a media program (e.g. content) identifier. In which case, searching for the relevant segments comprises matter of searching for blocks 304 (or segments 308) that include the media program identifier associated with the selected media program.

Figure 5:
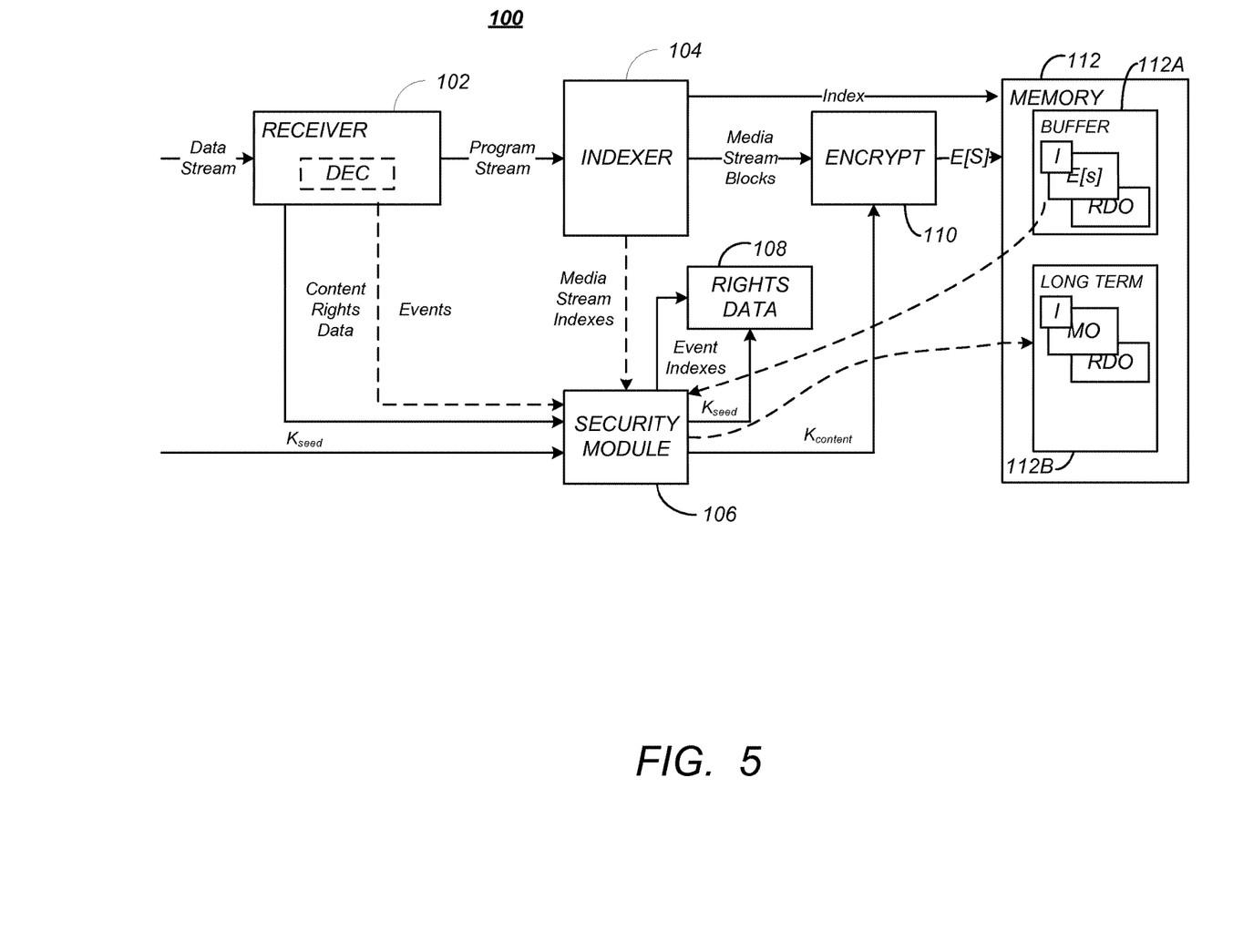
FIG. 5 is a diagram illustrating the foregoing process of moving media program from buffered storage into long term storage.

FIG. 5 is a diagram illustrating the foregoing process of moving media program from buffered storage 112A into long term storage 112B. In this embodiment, it is assumed that all data is stored in memory 112, but as described above, the encrypted media segments E[S], the media block indexes (I) and the rights data object (RDO) can be stored in partitioned memory, or in separate memory devices. For example, the security module may use a different memory device (other than memory 112) to store the rights data such as the event indexes or the key seed. As illustrated, in response to the receipt of the command to store the media program stored in the LOD buffer 112A, the security module 106 retrieves the rights data from the buffer 112A. This rights data includes the event index and key seed for each of the segments that together comprise the requested media program. Once the segments are identified, the media program object (MO) is generated from the identified segments, and a rights data object (RDO) is generated from the rights data object (RDO) elements associated with the identified media segments. The result is then stored in long term storage 112B.

Figure 6:
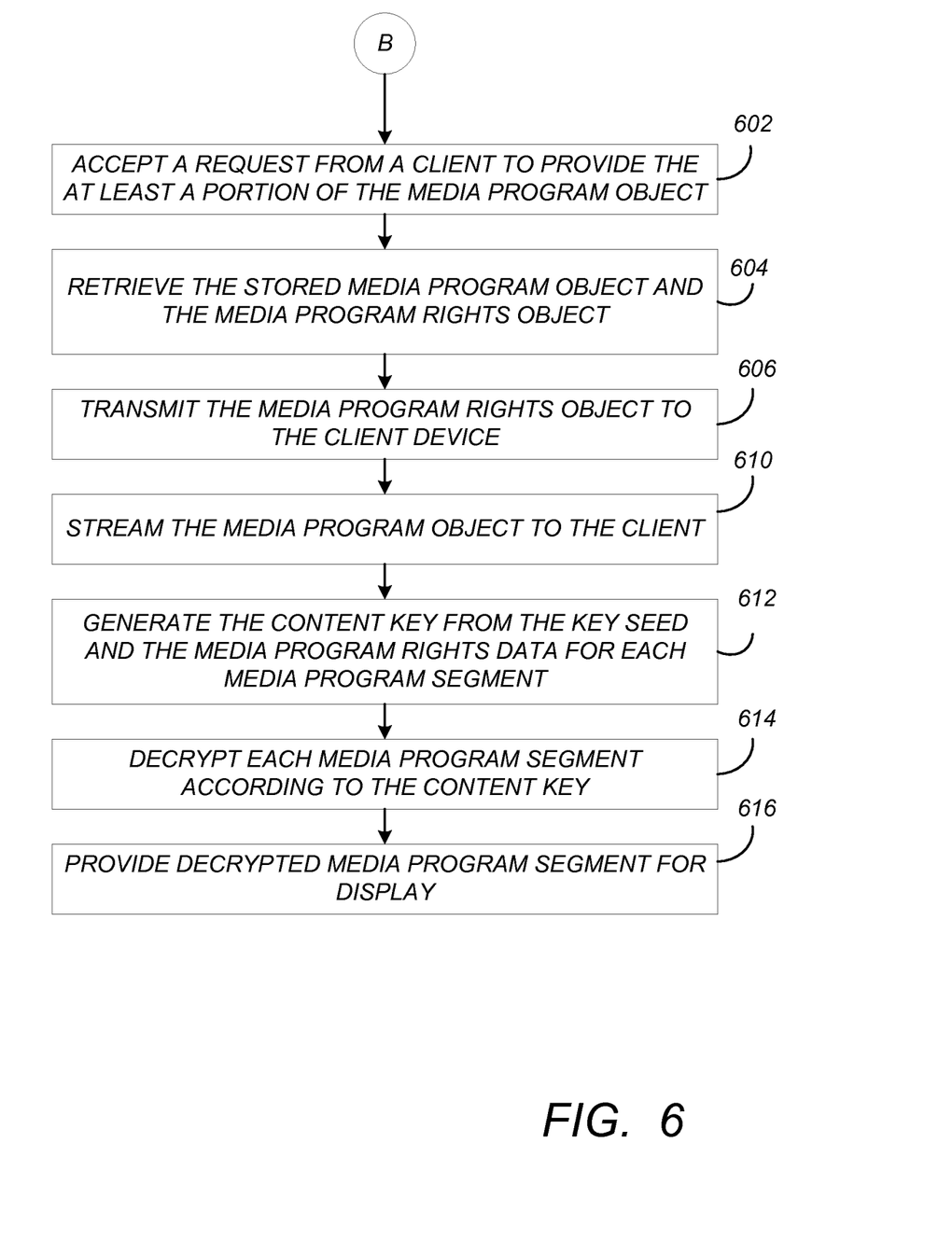
FIG. 6 is a diagram illustrating exemplary operations by which a media program stored as described above may be transmitted to a requesting client and thereafter played back.

FIG. 6 is a diagram illustrating exemplary operations by which a media program stored as described above may be transmitted to a requesting client and thereafter played back. In block 602, a request is accepted from a client to provide the at least a portion of the media program stored in long term storage 112B as described above. In response to this request, the gateway DVR 100 retrieves the stored media program object (MO) and media program rights data object (RDO), as shown in block 604. In one embodiment, this process is be managed by the security module 106. The data within the media program rights data object (RDO) is transmitted to the client device, as shown in block 606.

The event indexes and key seed contained within the media program rights data object (RDO) may be transmitted together to the client device 700, but in the embodiment illustrated in FIG. 6, the event indexes are transmitted in a different transmission than the key seed. In this embodiment, the security module 106 retrieves the media program rights data object (RDO), extracts the key seed, and transmits the key seed to the device 700 via a secure communications channel, and the gateway DVR 100 transmits the event indexes to the client device 700 via a different (and potentially non-secure communication path).

Returning to FIG. 6, the media program object is then streamed to the client device 700. This may comprise streaming the media program in blocks 304 along with the media program block indexes ($I_1$-$I_N$) to the blocks 305, streaming the media program in segments 308 along with the event indexes 306.

Figure 7:
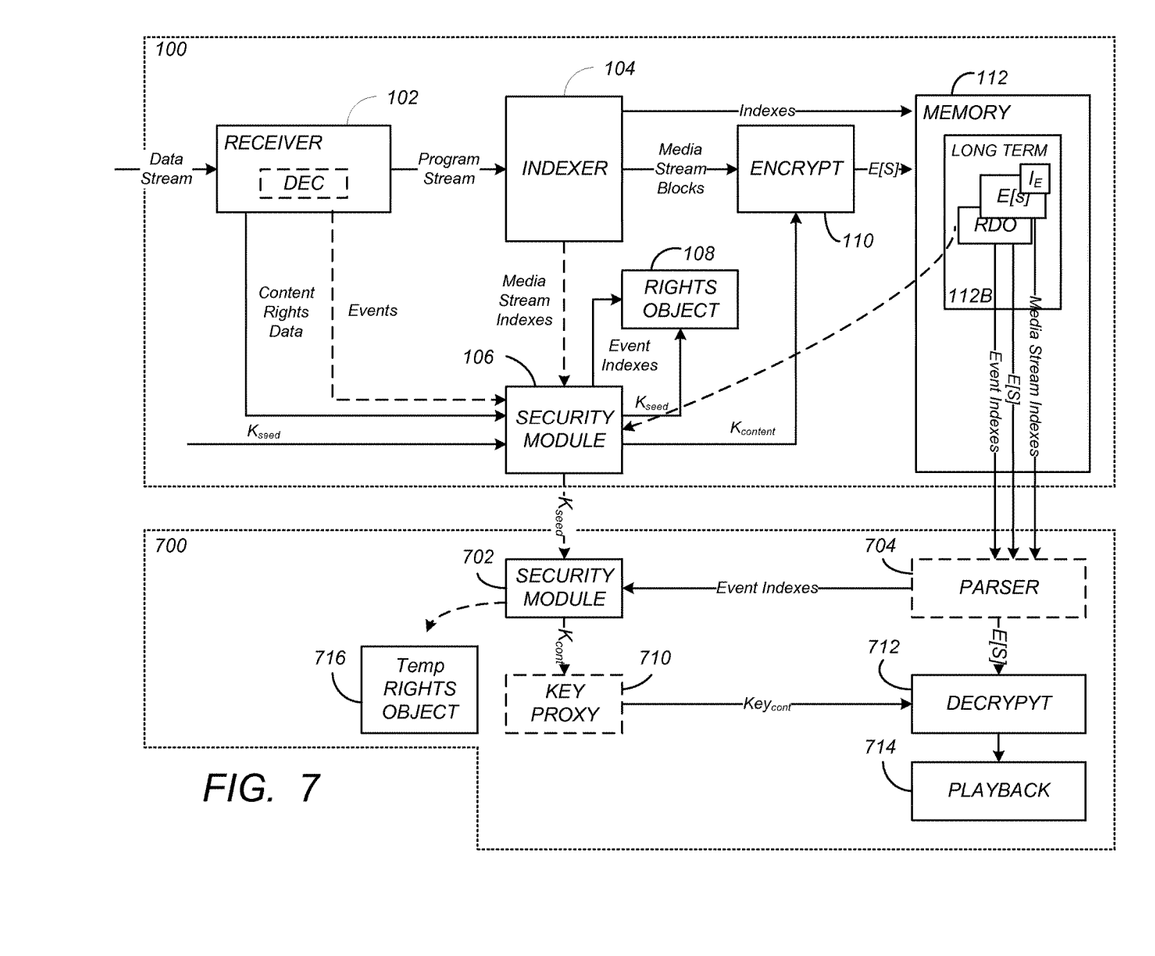
FIG. 7 is a drawing illustrating the gateway DVR transmitting a media program to a client playback device.

FIG. 7 is a drawing illustrating the gateway DVR 110 transmitting a media program to a client playback device 700. In the embodiment shown in FIG. 7, the event indexes and media program object comprising the encrypted media segments 308 embodying the selected media program are transmitted to the client device 700 together, and are separated using the parser 714. The parser 704 then provides the event indexes to the security module and the encrypted media program segments to decryptor 712, which decrypts the media segments 308 to reverse the encryption operation applied by encryptor 110. In the illustrated embodiment, the same content key is used to encrypt the media program segments 308 as is used to decrypt them. This is known as symmetric encryption via a shared secret. However, other encryption techniques may be employed, including asymmetric cryptography, utilizing public/private key techniques. Also, the encryption can be implemented by use of a shared secret algorithm rather than a secret key.

The client device 700 comprises an associated security module 702 that receives the key seed securely transmitted by the security module 106 of the gateway DVR 100, and using the key seed and the event indexes received by the client device 700 (e.g. the parser 704), regenerates the content key for each media segment 308. This operation is shown in block 612. The security module then generates a temporary rights object 716 that includes the rights objects provided in the media program rights data object (RDO) received from the gateway DVR 100. This temporary rights object 716 will be used by the security module 702 to store and retrieve information required to generate the content keys for each of the media segments using the event indexes. The security module 702 then regenerates the content key using the key seed and the event indexes, and forwards the key to the decryptor 712. In one embodiment, the content key is securely provided to the decryptor 712 via a key proxy 710 to prevent exposure of they key. The decryptor 712 then decrypts each media program segment according to the received content key as shown in block 614. The decrypted media program segment is then provided for display on a suitable device, as shown in block 616.

Although the foregoing operations are described with respect to a gateway DVR 100 streaming a media program to a client device 700, the client device 700 operations may instead be performed by the gateway DVR 100 for playback. In such case, a single security module can be shared for both operations, and a secure communications channel between the security modules is no longer required. Further, the transmission of the event indexes and encrypted segments may be performed without using a streaming protocol, with the segments instead simply being identified by the event indexes, recalled from the long term memory 112, and played back using operations analogous to those above. Further, playback of programs within the LOD buffer 112A may also be performed while other data is being stored in the LOD buffer 112A, whether by the client device 700 or a gateway DVR performing analogous functions using the same operations described above.

Application to IPRM and HTTP Live Streaming

Advantageously, the foregoing storage and playback paradigm dovetails well with media streams handled using the HLS protocols and secured using IPRM. In the HLS protocol, an incoming media stream is broken into media stream blocks known as "chunks."

Figure 8:
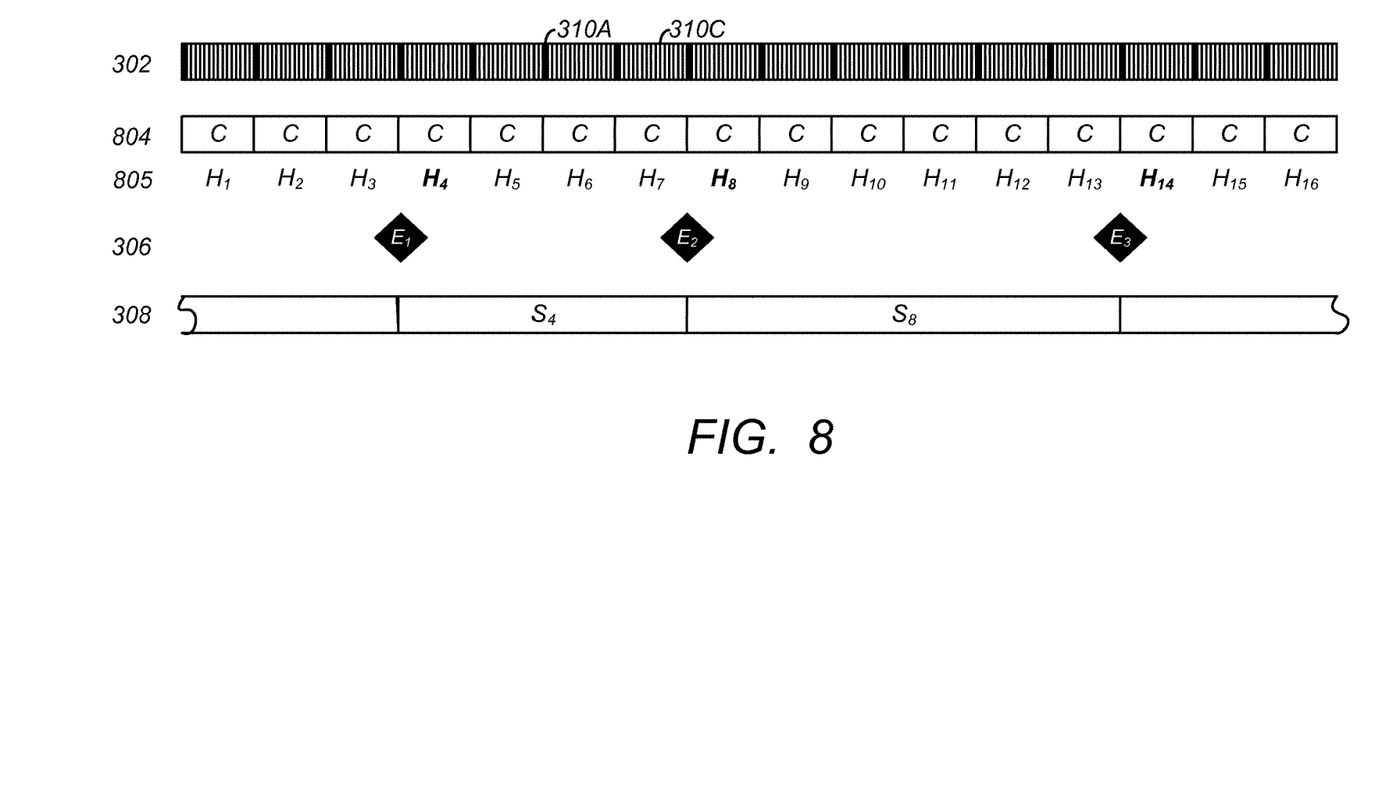
FIG. 8 is a diagram depicting the indexing of the media stream using an HLS streaming protocol.

FIG. 8 is a diagram depicting the indexing of the media stream using an HLS streaming protocol. Each chunk 804 is made available by the gateway DVR 100 at an address provided in a structure known as an index file, (.m3u8) playlist, or manifest. If a media stream was comprises of only three 10 second chunks, the playlist may appear as follows:

EXT-X-VERSION:3
    #EXTM3U
    #EXT-X-TARGETDURATION:10
    #EXT-X-MEDIA-SEQUENCE:1
    #EXTINF:10.0,
    http://media.example.com/chunk1.ts
    #EXTINF:9.5,
    http://media.example.com/chunk2.ts
    #EXTINF:9.0,
    http://media.example.com/chunk3.ts
    #EXT-X-ENDLIST where "chunk1.ts," "chunk2.ts," and "chunk3.ts" refer to the chunks available at the addresses indicated by the URLs in the playlist. The playlist of chunks 804 is provided to the client playback device 700, and the client playback device 700 uses this playlist to request one chunk 804 after the other. Barring trick play, such chunks 804 are requested in the order they are presented on the playlist, but with trick play commands, the client device 700 may request any of the chunks 804 in the playlist in any order. These chunks are substantially analogous to the media program blocks 304 depicted in FIG. 3, and the indexes $I_1$-$I_N$ also shown in FIG. 3 are analogous to the chunk address entries that are in the playlist (e.g. http://media.example.com/chunk1.ts," http://media.example.com/chunk2.ts, and http://media.example-.com/chunk3.ts). Although the media stream blocks depicted in FIG. 3 typically begin with an I frame and extend to the next I-frame, chunks may include no I frames or more than one I frame.

Further, each of the media block indexes $I_1$-$I_N$ shown in FIG. 3 are each analogous to the http address entries in the playlist above, and are indicated by $H_1$-$H_N$ in FIG. 8. The HLS playlist is therefore analogous to a list of $H_1$-$H_N$ in sequential order of presentation.

IPRM is a content rights management system for streaming applications that uses two parameters to derive the content encryption key. Those two parameters include (1) a key seed or subkey and (2) content key identifying data (CKID).

The key seed can be derived from a content ID identifying the media program embodied in the media stream or a randomly generated seed. The content ide can comprise the name of the asset (media program) or a combination of channel and program names)

The CKID is a collection of copy control data which may include copy control information (CCI). The CCI of IPRM is analogous to the content rights data depicted in FIG. 3, and may be received as a part of the data stream received by the receiver 102 or by other means.

Figure 9:
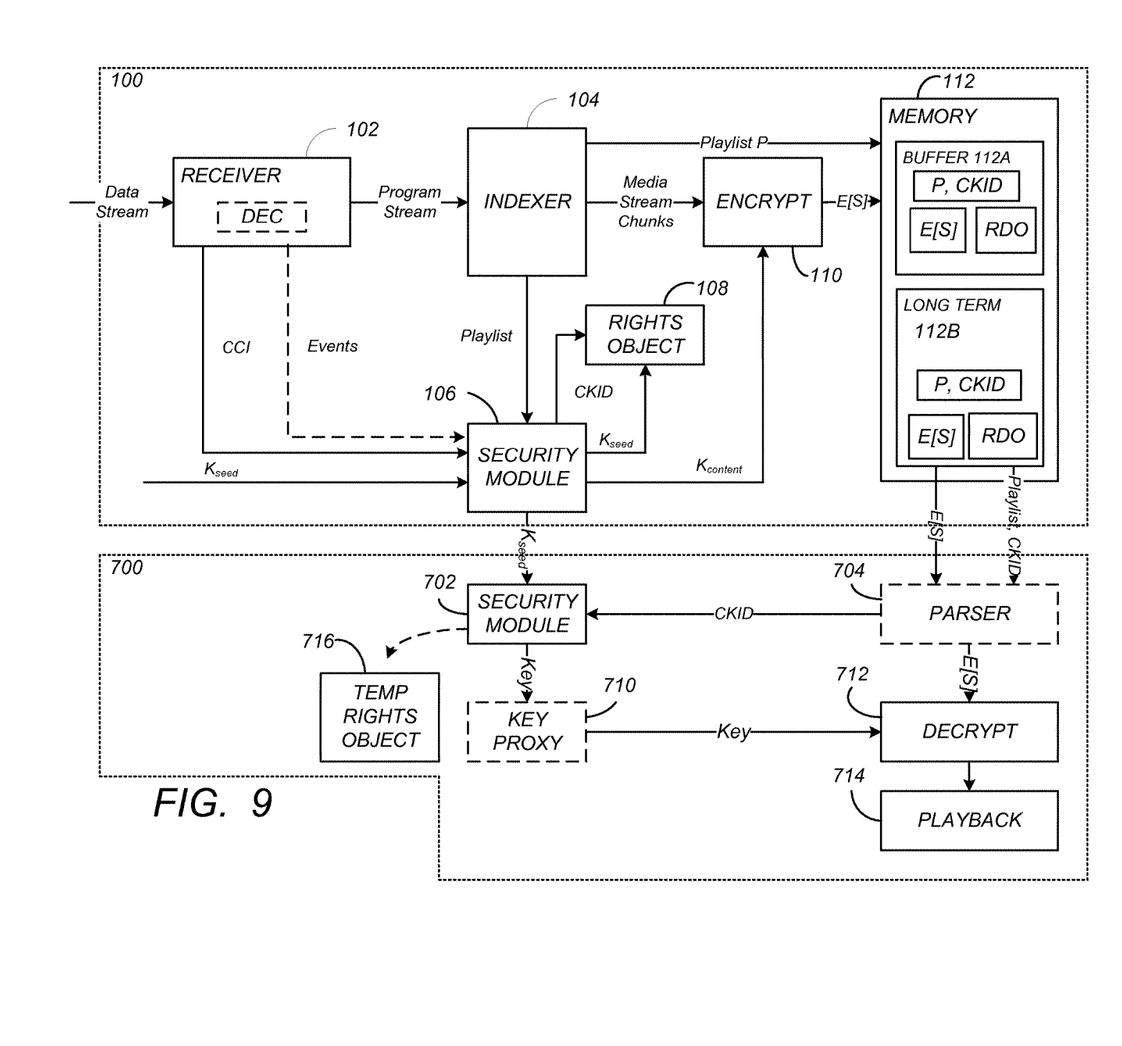
FIG. 9 is a diagram illustrating elements analogous to those of FIG. 7, in an HLS and IPRM context.

FIG. 9 is a diagram illustrating elements analogous to those of FIG. 7, in an HLS and IPRM context. A data stream is received by the receiver 102 and decrypted (if encrypted), and CCI data and a media program stream is parsed from the data stream. The CCI data is provided to the security module 106, and the media program stream is provided to the indexer 104. The indexer 104 performs the indexing operations to separate the media stream into chunks as described above with respect to FIG. 8, producing chunks C and the playlist $H_1$-$H_N$. The chunks are provided to the encryptor 110 and the playlist may be provided to the security module 106. The security module 106 generates media program rights data from the CCI, events and the key seed for each segment, as triggered by events, as described above. This data is later compiled into a media program rights data object (RDO) 108 or IPRM rights data file. The media program rights data object (RDO) 108 operates as a license for the segments that together comprise the object, and include, for example, the IPRM content ID used to derive the key seed, the key seed itself, and data regarding each segment, including the CCI data associated with the segment, an index of the segment, and a time stamp associated with the segment. The IPRM content ID may be the channel number, the program name (as obtained for example, from an electronic program guide), or an asset name designated by the user when converting to long term storage.

The security module 106 also generates a content key identifier (content key ID) from the CCI as well as other data. The CKID can later be used to identify and regenerate content key using the key seed. In one embodiment, the CKID is generated from the CCI data by encoding the data described in Table I below in base 64 encoding.

TABLE 1

| Field | Size (bytes) | bit # |
|---|---|---|
| Index | 1 | |
| Time Stamp | 4 | |
| Copy Control Data | 1 | |
| CCI | | 0-1 |
| APS | | 2-3 |
| CIT | | 4 |
| RCT | | 5 |
| Reserved | | 6-7 |
| Copy Control Enhance | 1 | |
| Domain Copy | | 0 |
| Analog Disable | | 1 |
| Analog Sunset | | 2 |
| Digital Comp/Disable | | 3 |
| RemoteAccessEnable | | 4 |
| HDMIDisable | | 5 |
| Airplay Enable | | 6 |
| Reserved | | 7 |

This would result in a CKID of 010A4589BF01A. The CKID can be appended to the KeyTag (*EXT-X-KEY) in the playlist. For example, the following entry may be included in the HLS playlist: lprm://gateway/channel-1?CKID=010A4589BF01A. Since a new CKID is generated when the CCI changes or another event occurs, the CKID functions as the event index described above.

Returning to FIG. 9, the media stream chunks are provided from the indexer to encryptor 110, which encrypts the one or more chunks that make up a segment using the content key to produce a series of encrypted segments E[S], which are stored in LOD buffer 112A. The playlist P indexing the media program chunks 804 may also be stored in the LOD buffer 112A or elsewhere in the gateway DVR 100, as well as the rights data generated by the security module 106.

The security module 106 responds to channel changing event 306 (for example, the user switching from one cable channel to another, thus changing the CCI data and media program stream) by calling an application program interface (API) to create a rights data file or object. This can be implemented by an API to create a data rights file or object. This API accepts the channel ID and CCI data as an input, and generates an output CKID, as well as a content key generated from the CKID and the key seed. The content key is used to encrypt the media chunk that begins at the channel change. The output CKID is appended to a key tag and added to the playlist. Hence, upon an event changing from channel-1 to channel-2, the value of a key tag (#EXT-X-KEY) generated by the security module 106 and added to the playlist may change as follows:

lprm://gateway/Channel-1_Live?CKID=af2398bc3
 lprm://gateway/Channel-2_Live?CKID=edc2398b2

Similarly on an event requesting a particular media program (program-A) to be recorded, the security module 106 may call an IPRM API to create data rights. This API also accepts the channel ID and CCI as input, and generates an output CKID and a content key generated from the CKID and the key seed. The security module 106 also appends the value of the CKID to a key tag and adds the result to the playlist. The value of the key tag generated by the security module 106 and added to the playlist may change due to the recording request as follows:

lprm://gateway/Channel-1_Live?CKID=af2398bc3
 lprm://gateway/Program-A?CKID=4c43398b2

On an event wherein the CCI data itself changes (indicating a change in rights), the security module 106 calls an IPRM API to extend the data rights. This API accepts the CCI as input, and outputs an output CKID and a content key generated from the CKID and the key seed. The value of the key tag generated by the security module 106 and added to the playlist may change as follows:

lprm://gateway/Channel-1_Program-A?CKID=12f2398bc3
 lprm://gateway/Channel-1_Program-A?CKID=ecec2398b2

When the gateway DVR 100 accepts a command designating at least a portion of the media program that comprises one or more of the buffered media program segments 308 for long term storage, the security module 702 calls an API to clone the buffered data rights file for use in the long term storage of the buffered media program segments 308. The input to this API include the channel ID, the asset name (to derive the content ID), and the starting and ending CKID for the media selected at least a portion of the media program. In one embodiment, the gateway DVR 100 maintains a table relating timestamps and CKIDs for all segments in the LOD buffer 112. The gateway DVR uses the time stamp to look up the starting and ending CKIDs required by the API that clones the buffered data rights. Using the CKID data, the security module 106 identifies the media segments that together comprise the requested media program, assembles the identified media segments and CKIDs to generate the media file object and the media file rights object, and places these objects in long term storage for later retrieval.

As described in the analogous operations described in FIG. 6, the media program segments 308 in buffered or long term 112B storage can be recalled for playback. After accepting a request from the client device 700 to provide at least a portion of the media program object, the security module 106 retrieves the stored media program object and the media program rights object needed to decrypt and play the stored media program object. As described above with respect to FIG. 6, the CKIDs and key seed of the media program rights object can be transmitted to the client device together, but in the embodiment shown in FIG. 9, the CKIDs are transmitted to the client device 700 in a different transmission than the key seed. In this embodiment, the security module 106 retrieves the media program rights data object (RDO), extracts the key seed, and transmits the key seed to the device via a secure communications channel, and the gateway DVR 100 transmits the CKIDs to the client device 700 via a different (and potentially non secure communications path). In the HLS embodiment, the CKIDs are transmitted to the client device 700 appended to the playlist(s) that are used to identify the media chunks in the order they are to be played, as described above. Parser 704 parses through the playlist to find the CKIDs, and provides them to the client device security module 702. Using the key received via the secure communication path and the CKIDs received from the parser 704, the client device security module 702 generates the content key, and provides it to the decryptor 712, optionally through a key proxy 710 as described above. The decryptor accepts the encrypted media segments E[S] that were encrypted using the key seed, decrypts the segments, and provides the decrypted segments for playback, as shown in block 714. The client device security module 702 may also generate a temporary rights object for playback purposes.

Hardware Environment

Figure 10:
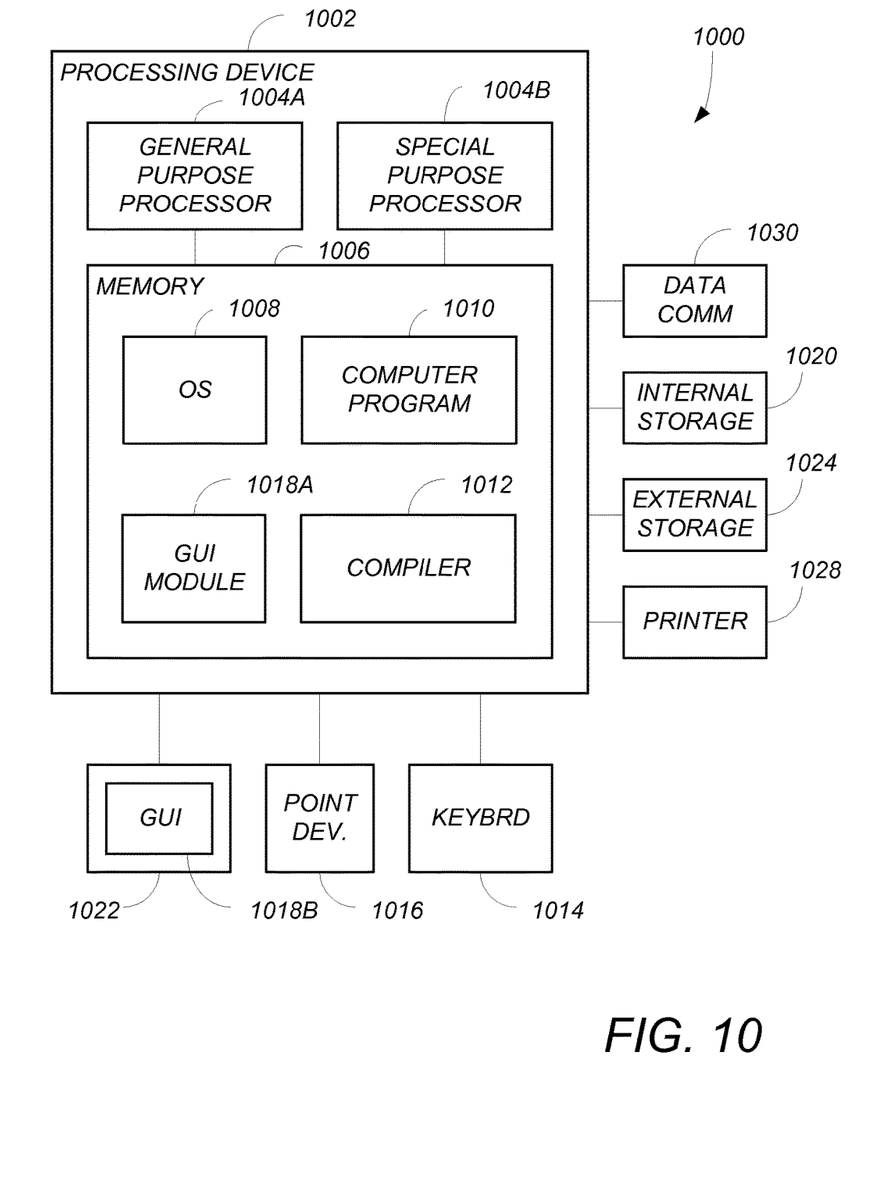
FIG. 10 is a diagram illustrating an exemplary computer system 1000 that could be used to implement elements of the present invention, including elements of the gateway DVR 100 and client playback device 700.

FIG. 10 is a diagram illustrating an exemplary computer system 1000 that could be used to implement elements of the present invention, including elements of the gateway DVR 100 and client playback device 700. The computer system 1000 includes a processing device such as a computer 1002, which comprises a general purpose hardware processor 1004A and/or a special purpose hardware processor 1004B (hereinafter alternatively collectively referred to as processor 1004) and a memory 1006, such as random access memory (RAM). The computer 1002 may be coupled to other devices, including input/output (I/O) devices such as a keyboard 1014, a mouse device 1016 and a printer 1028.

In one embodiment, the computer 1002 operates by the general purpose processor 1004A performing instructions defined by the computer program 1010 under control of an operating system 1008. The computer program 1010 and/or the operating system 1008 may be stored in the memory 1006 and may interface with the user and/or other devices to accept input and commands and, based on such input and commands and the instructions defined by the computer program 1010 and operating system 1008 to provide output and results.

Output/results may be presented on the display 1022 or provided to another device for presentation or further processing or action. In one embodiment, the display 1022 comprises a liquid crystal display (LCD) having a plurality of separately addressable pixels formed by liquid crystals. Each pixel of the display 1022 changes to an opaque or translucent state to form a part of the image on the display in response to the data or information generated by the processor 1004 from the application of the instructions of the computer program 1010 and/or operating system 1008 to the input and commands. Other display 1022 types also include picture elements that change state in order to create the image presented on the display 1022. The image may be provided through a graphical user interface (GUI) module 1018A. Although the GUI module 1018A is depicted as a separate module, the instructions performing the GUI functions can be resident or distributed in the operating system 1008, the computer program 1010, or implemented with special purpose memory and processors.

Some or all of the operations performed by the computer 1002 according to the computer program 1010 instructions may be implemented in a special purpose processor 1004B. In this embodiment, some or all of the computer program 1010 instructions may be implemented via firmware instructions stored in a read only memory (ROM), a programmable read only memory (PROM) or flash memory within the special purpose processor 1004B or in memory 1006. The special purpose processor 1004B may also be hardwired through circuit design to perform some or all of the operations to implement the present invention. Further, the special purpose processor 1004B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 1002 may also implement a compiler 1012 which allows an application program 1010 written in a programming language such as COBOL, C++, FORTRAN, or other language to be translated into processor 1004 readable code. After completion, the application or computer program 1010 accesses and manipulates data accepted from I/O devices and stored in the memory 1006 of the computer 1002 using the relationships and logic that was generated using the compiler 1012.

The computer 1002 also optionally comprises an external communication device such as a modem, satellite link, Ethernet card, or other device for accepting input from and providing output to other computers.

In one embodiment, instructions implementing the operating system 1008, the computer program 1010, and/or the compiler 1012 are tangibly embodied in a computer-readable medium, e.g., data storage device, which could include an internal storage device 1020 or external storage device 1024 in the form of one or more fixed or removable data storage devices, such as a zip drive, floppy disc drive, hard drive, CD-ROM drive, tape drive, or a flash drive. Further, the operating system 1008 and the computer program 1010 are comprised of computer program instructions which, when accessed, read and executed by the computer 1002, causes the computer 1002 to perform the steps necessary to implement and/or use the present invention or to load the program of instructions into a memory, thus creating a special purpose data structure causing the computer to operate as a specially programmed computer executing the method steps described herein. Computer program 1010 and/or operating instructions may also be tangibly embodied in memory 1006 and/or data communications devices 1030, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 1002.

Although the term "computer" is referred to herein, it is understood that the computer may include portable devices such as cellphones, portable MP3 players, video game consoles, notebook computers, pocket computers, or any other device with suitable processing, communication, and input/output capability.

Conclusion

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the apparatus and method of the invention. Since many embodiments of the invention can be made without departing from the scope of the invention, the invention resides in the claims hereinafter appended.

What is claimed is:
1. A method of providing at least a portion of a temporary buffered media video stream in a live off disk (LOD) form for future long term storage in a media server memory device accessible by a plurality of video players, the method comprising:
 receiving the media video stream in the media server memory device comprising at least a portion of a buffer for the temporary buffered media program streamed in LOD form and content rights data defining one or more rights to use the at least a portion of the buffered media program on the media server by at least one video players device;
 generating media stream indexes from the received media video stream in real time within a live off disk (LOD) buffer on the media server, each of the media stream indexes being associated with one of a plurality of media stream events as occurring in real time;
 generating event indexes delimiting ones of the media stream indexes that correspond to events occurring temporally during reception of the media stream within the live off disk (LOD) buffer, the events defining one of a plurality of media stream segments there between;
 generating a content key for each of the media stream segments according to the content rights data and a key seed and providing an indication that the content key for decryption comes from a digital rights management (DRM) system that provides the key seed and a separately provided content key identifier (CKID) used to generate the content key;
 encrypting each of the media stream segments according to the content key associated with each media segment;
 generating media program rights data comprising the key seed and the event index for each of the media stream segments; and
 buffering each of the media stream segments and the media program rights data associated with each of the media stream segments,
 wherein:
 the media stream segments are media stream chunks defined according to an HTTP live streaming proto- col (HLS) and the media stream indexes together comprise an HLS playlist of the media stream chunks;

the media program event indexes each comprises the CKID identifying the content rights of the associated media stream segment; and the key seed and the event indexes are stored in the memory to be delivered independent from the media stream chunks, and the video players use the content rights data and the key seed to identify associated ones of the media stream chunks and decrypt the media stream chunks in real time in the live off disk (LOD) buffer as the media stream chunks come from the media server during streaming to the video players dynamically.

2. The method of claim 1, wherein the event indexes comprise content key identifiers, each associated with one of the media steam segments.

3. The method of claim 1, further comprising:
accepting a command designating at least a portion of media program comprising one or more of the buffered media segments in the LOD for long term storage;
identifying the media segments together comprising the at least a portion of the media program;
assembling the identified media segments and media program rights data associated with the identified media segments into a media program object and a media program rights object; and
storing the media program object and the media program rights object in long term storage.

4. The method of claim 3, further comprising:
accepting a request from a client to provide the at least a portion of the media program object;
retrieving the stored media program object and the media program rights object;
transmitting the media program rights object to the client device; and
streaming the media program object to the client.

5. The method of claim 4, further comprising:
retrieving the key seed from the media program rights object;
generating the content key from the key seed and the media program rights data for each of the media program object;
decrypting each media program object according to the content key.

6. The method of claim 1, further comprising:
retrieving the key seed from the media program rights object;
generating the content key from the key seed and the media program rights data for each media program segment;
decrypting each media program object according to the content key.

7. The method of claim 3, wherein the video players upon receipt of the streaming media assemble the identified media segments and the media program rights data associated with the identified media segments into the media program object and a media program rights object, wherein the assembling comprises:
assembling the identified media stream chunks associated with the media stream segments into the media program object;
generating a further HLS playlist for the assembled media stream chunks, the HLS playlist further comprising the CKID associated with each of the segments of the at least a portion of the media program; and
assembling the media program rights data associated with the media stream blocks into the media program rights object.

8. The method of claim 1, wherein the content rights are received with the media stream.

9. The method of claim 1, wherein the events comprise a change in the received content rights data and a channel change, and wherein the key seed is a media program identifier.

10. The method of claim 1,
wherein a signal for a change of the seed key is made by changing a first part of a url for the key tag, and
wherein a signal for a change of the CKID is made in a separate part of the url from the first part and when a change of the CKID is made, everything else in the url remains unchanged.

* * * * *